United States Patent
Overbo

[19]

[11] Patent Number: 5,995,345
[45] Date of Patent: Nov. 30, 1999

[54] DATA STORAGE CARTRIDGE AND ADAPTER

[76] Inventor: David M. Overbo, 23 N. Mills St., Madison, Wis. 53715

[21] Appl. No.: 08/972,303

[22] Filed: Nov. 18, 1997

[51] Int. Cl.[6] .................................................. G11B 23/03
[52] U.S. Cl. ........................................... 360/133; 369/291
[58] Field of Search ................................ 360/133, 97.01; 369/289, 291

[56] References Cited

U.S. PATENT DOCUMENTS

| | | | |
|---|---|---|---|
| 4,605,125 | 8/1986 | James .................................... 206/312 |
| 5,140,489 | 8/1992 | Barnard .................................. 360/133 |
| 5,208,802 | 5/1993 | Suzuki et al. ......................... 369/289 |
| 5,331,627 | 7/1994 | Childers et al. ...................... 369/291 |
| 5,715,233 | 2/1998 | Yoshida et al. ....................... 369/289 |
| 5,771,143 | 6/1998 | Vernois .................................. 360/133 |
| 5,796,713 | 8/1998 | Tanaka .................................. 369/291 |
| 5,809,520 | 9/1998 | Edwards et al. ...................... 360/133 |
| 5,841,605 | 11/1998 | Foster et al. ......................... 360/97.01 |
| 5,867,476 | 2/1999 | Yoshida et al. ....................... 369/289 |

*Primary Examiner*—Jefferson Evans
*Attorney, Agent, or Firm*—DeWitt Ross & Stevens S.C.

[57] ABSTRACT

Disclosed is a data storage cartridge in combination with an adapter. The data storage cartridge/adapter combination is dimensioned and configured to orient the data storage cartridge so that it operates in a disk drive device designed for a second cartridge which is larger in size than the data storage cartridge. In the preferred embodiment, the combination provides a credit card-sized data storage cartridge and an adapter therefor which enables the data storage cartridge to operate in a 3.5-inch format disk drive device.

15 Claims, 11 Drawing Sheets

DATA STORAGE CARTRIDGE AND ADAPTER

FIELD OF THE INVENTION

The invention is drawn to a data storage cartridge of reduced size and an adapter therefor which enables the data storage cartridge to be utilized in a disk drive device designed for a cartridge of relatively larger size.

DESCRIPTION OF THE PRIOR ART

Cartridges containing magnetic, magneto-optical, or optical material for storing and transporting digital data are now widely known. Since their initial commercialization in the 1970's, the dimensions of these cartridges, referred to generically as "floppy disks," have become smaller and smaller. For example, the first widely-implemented floppy disk format utilized 8-inch diameter disks. This format was supplanted by smaller 5.25-inch diameter disks. Now, the 5.25-inch floppy disk format has been largely (if not entirely) replaced with a 3.5-inch diameter floppy disk format.

The 3.5-inch floppy disk format is standardized throughout the personal computer marketplace and is used in virtually all personal computers currently in the market. The designation "3.5-inch format" is something of a misnomer in that the disks are not square: they are 3.5 inches in width, but slightly greater in length (about 3.68 inches). As used herein, the terms "3.5-inch floppy disk" or "3.5-inch format" designate any floppy disk or floppy disk drive device which operates using the conventional and well known 3.5-inch floppy disk cartridge format.

At the same time that the physical dimensions of floppy disks have been decreasing, their data storage capacity has been increasing. When first marketed, the 3.5-inch floppy disks had magnetic material on only one side of the disk and had a storage capacity of about 400 kilobytes, roughly the same as the 5.25-inch format. Then, the double-sided 3.5-inch format, wherein magnetic material was placed on both sides of the disk, was introduced, which effectively doubled the storage capacity to 800 kilobytes. A further development is the now-widely-used "double-sided, high-density" 3.5-inch format, in which the 3.5-inch floppy disk has a data storage capacity of about 1.44 megabytes.

Newly introduced into the market place is another 3.5-inch format floppy disk which has a data storage capacity of about 120 megabytes. This 3.5-inch format disk and complementary drive is marketed by the Imation Enterprises Corporation (Oakdale, Minn.) under the trademark "SUPERDISK." "SUPERDISK"-brand floppy disks have the same external dimensions, and are dimensioned and configured, in the same fashion as conventional 3.5-inch floppy disks. However, the magnetic material within "SUPERDISK"-brand floppy disks allows for more densely-packed data storage, hence its increased capacity. Imation Enterprises also markets a complementary "SUPERDISK"-brand disk drive device which accesses the increased data storage capabilities of the "SUPERDISK"-brand floppy disks. Notably, the "SUPERDISK"-brand disk drive device also functions with the older 1.44 megabyte, double-sided, high-density 3.5-inch floppy disks.

Other floppy disk formats in addition to the conventional 3.5-inch format are also now coming into widespread use. Of particular note for its data storage capacity (100 megabytes per disk cartridge) and affordability are the "ZIP"-brand floppy disks and disk drive devices manufactured by the Iomega Corporation (Roy, Utah). While far newer than the 3.5-inch format, "ZIP"-brand format disks and disk drivers have sold briskly in the market place. For instance, "ZIP"-brand cartridges are now manufactured under license by a variety of manufacturers and "ZIP"-brand internal disk drives and are now offered as a choice for factory-supplied storage devices by many computer manufacturers.

Both the 3.5-inch format and the "ZIP"-brand format suffer from a drawback in that the size of these cartridge formats, while relatively small, are not conducive to easy transport in a wallet or purse. But, because these formats have become widely standardized, developing and marketing a still smaller disk drive format is a daunting market challenge.

However, a disk drive format which uses a considerably smaller data storage cartridge (such as a cartridge the size of a standard credit card) is very attractive in that such a floppy disk cartridge would be easy to transport and would allow vital information, such business, financial, medical, or personal data, to be easily stored and carried on a person, such as in a purse or wallet. For example, past medical history, allergies, emergency contacts, and the like, could be stored on the smaller floppy disk and carried by a person indefinitely. Should that person then encounter a situation where this information is necessary, it could be readily accessed. Consequently, there is a distinct need for a data storage cartridge which is smaller in external dimensions than the widely-used formats noted above, but which can be utilized by disk drive devices designed for use with the standard formats.

Devices which adapt a data storage cartridge so that it can be used in a disk drive device designed for a different type of cartridge format have been described in the patent literature. For example, U.S. Pat. No. 5,331,627 to Childers et al. a smaller data storage cartridge within a disk drive apparatus expressly designed for holding a larger type of data cartridge. Specifically, Childers et al. describes a cartridge for holding a 90 mm optical disk cartridge for insertion into a 130 mm disk drive. Most notably, the adapter includes a hinged tray into which the smaller data disk fits. The tray is then closed to center the smaller disk over a spindle adapter. The spindle adapter functions to transform a standard spindle designed for 130 mm disk into a smaller spindle for centering and rotating a 90 mm disk. This arrangement is significantly different from the present invention, which does not require such a spindle adapter sub-assembly. The Childers et al. device also includes other elements, such as a permanent biasing magnet for writing to optical disks, which are irrelevant to the present invention.

Likewise, U.S. Pat. No. 5,208,802 to Suzuki et al. describes a planar insert for centering a miniature compact disc (CD) within a standard CD player. The planar insert functions to center the miniature CD over the spindle of the standard CD player. In essence, the insert acts as both a centering means and a disk retaining means to allow the miniature CD to be properly centered and rotated about its central axis.

Similarly, integrated data storage cartridges which can function in more than one type of disk drive device are known. See, for example, U.S. Pat. No. 5,140,489 to Barnard. This patent describes a cartridge wherein the data storage material can either be extracted from the cartridge prior to recording/playback or the data storage material can be accessed from within the interior volume of the cartridge via a sliding door. The cartridge described by Barnard includes an opening along one edge of the cartridge to allow the media contained therein to be extracted by a disk drive device and manipulated accordingly. When operated in this fashion, the media is inserted back into the cartridge prior to removal of the cartridge from the disk drive device. The Barnard cartridge also includes a sliding door to allow the media to be accessed in situ by read/write heads and an aperture to allow the media to be rotated within the cartridge in the same fashion as a conventional floppy disk.

Other well-known elements included in the conventional 3.5-inch and "ZIP"-brand cartridge formats may also be incorporated into the invention described hereinbelow. For instance, U.S. Pat. No. 4,605,125 to James describes the motion-limiting indentations which are found on the bottom face of the conventional 3.5-inch floppy disks described above. The indentations are necessary to limit the motion of the magnetic media within the rectangular enclosure. Without the motion-limiting stops, the disk-shaped magnetic material would be free to move further along the long axis of the rectangular enclosure as compared to the short axis. By limiting the disk to an equal amount of movement in all radial directions, the hub of the disk can be accurately centered over the spindle of the disk drive device.

SUMMARY OF THE INVENTION

A first embodiment of the invention is a data storage cartridge in combination with an adapter, the adapter dimensioned and configured to orient the data storage cartridge so that it operates in a disk drive device designed for a second cartridge which is larger in size than the data storage cartridge, the combination comprising:

A data storage cartridge comprising a planar housing having opposing front and rear edges and two opposing side edges, the edges connected by depending top and bottom faces, thereby defining an external length, width and height and an interior volume. The interior volume is dimensioned and configured for rotatably accommodating a disk medium therein, the housing further having a first aperture in the bottom face thereof and at least a second aperture therein. A disk medium comprising a disk-shaped data storage and retrieval material and a hub disposed at the center thereof is rotatably disposed within the interior volume of the data storage cartridge such that the hub is operationally accessible to a spindle in the disk drive device for the second cartridge via the first aperture and the data storage and retrieval material is operationally accessible to a read/write head in the disk drive device for the second cartridge via the second aperture. The data storage cartridge operates in combination with an adapter comprising a planar, substantially U-shaped body dimensioned and configured to form a friction fit against the rear and side edges of the data storage cartridge. When the data storage cartridge is disposed within the adapter to yield a cartridge-adapter combination, the combination has external dimensions which are substantially identical to the external dimensions of the second cartridge, whereby the data storage cartridge can be used in the disk drive device.

A second embodiment of the invention is a data storage cartridge in combination with an adapter, the adapter dimensioned and configured to orient the data storage cartridge so that it operates in a 3.5-inch format disk drive device. Again, the data storage cartridge comprises a planar housing having opposing front and rear edges and two opposing side edges, the edges connected by depending top and bottom faces, thereby defining an external length, width and height and an interior volume, the interior volume dimensioned and configured for rotatably accommodating a disk medium therein. Here, the housing includes a first aperture in the bottom face thereof, a second aperture in the bottom face thereof, and a third aperture in the top face thereof the third aperture being in registration with the second.

A disk medium comprising a disk-shaped data storage and retrieval material and a hub disposed at the center thereof is rotatably disposed within the interior volume of the data storage cartridge such that the hub is operationally accessible to a spindle in a 3.5-inch-format disk drive device and the data storage and retrieval material is operationally accessible to a read/write head in a 3.5-inch-format disk drive device via the second and third apertures.

The data storage cartridge further includes an L-shaped shutter disposed about the top face front edge, and bottom face of the housing and slidingly fixed thereto, the shutter movable between a first closed position blocking the second and third apertures and a second open position allowing access to the second and third apertures.

The data storage cartridge operates in combination with an adapter comprising a planar, substantially U-shaped body dimensioned and configured to form a friction fit against the rear and side edges of the data storage cartridge and wherein when the data storage cartridge is disposed within the adapter to yield a cartridge-adapter combination, the combination has external dimensions which are substantially identical to a 3.5-inch-format floppy disk cartridge.

A third embodiment of the invention is drawn to a data storage cartridge in combination with an adapter, the adapter dimensioned and configured to orient the data storage cartridge so that it operates in a "ZIP"-brand format disk device.

Here, the data storage cartridge comprises a planar housing having opposing front and rear edges and two opposing side edges, the edges connected by depending top and bottom faces, thereby defining an external length, width and height and an interior volume, the interior volume dimensioned and configured for rotatably accommodating a disk medium therein, the housing further having a first aperture in the bottom face thereof and a second aperture in the front edge thereof.

A disk medium comprising a disk-shaped data storage and retrieval material and a hub disposed at the center thereof is rotatably disposed within the interior volume of the data storage cartridge such that the hub is operationally accessible to a spindle in a "ZIP"-brand-format disk drive device via the first aperture and the data storage and retrieval material is operationally accessible to a read/write head of the "ZIP"-brand-format disk drive device via the second aperture.

The data storage cartridge further includes a shutter disposed about the top face, front edge, and bottom face of the housing and slidingly fixed thereto, the shutter movable between a first closed position blocking the second aperture and a second open position allowing access to the second aperture.

The data storage cartridge operates in combination with an adapter comprising a planar, substantially U-shaped body dimensioned and configured to form a friction fit against the rear and side edges of the data storage cartridge and wherein when the data storage cartridge is disposed within the adapter to yield a cartridge-adapter combination, the combination has external dimensions which are substantially identical to a "ZIP"-brand-format floppy disk.

A primary advantage of the present invention is that it allows a relatively smaller data storage cartridge to be used in a disk drive device expressly designed for another, larger-sized format, such as the 3.5-inch format or the "ZIP"-brand format. As a result, a new, smaller, more-easily transportable floppy disk format can be used without having to abandon the far more expensive disk drive devices which are currently in use. Therefore, without changing a single piece of expensive disk drive hardware, a much smaller floppy disk format can be used.

When having the same dimensions as a conventional credit card, 3.375 inch (8.573 cm) in length by 2.125 inch (5.398 cm) in width, another advantage of the data storage cartridge described herein is that when separated from its adapter it can be easily transported in a wallet or purse. This allows a vast amount of information to be carried by a person and accessed easily.

The data storage cartridge and adapter combination also allows retailers, professionals, transportation and warehousing operations, and the like to access required information from their customers and clients without having to elicit this information verbally or in writing. It also allows the smaller data cartridges to house "smart card" chips to limit access of personnel to certain areas at certain times and to track the traffic patterns of individuals through a facility.

The aims, objects, and advantages of the data storage cartridge and adapter will appear more fully from a complete reading of the Detailed Description of the Invention with reference to the attached drawing figures.

DETAILED DESCRIPTION OF THE INVENTION

Figure 1:
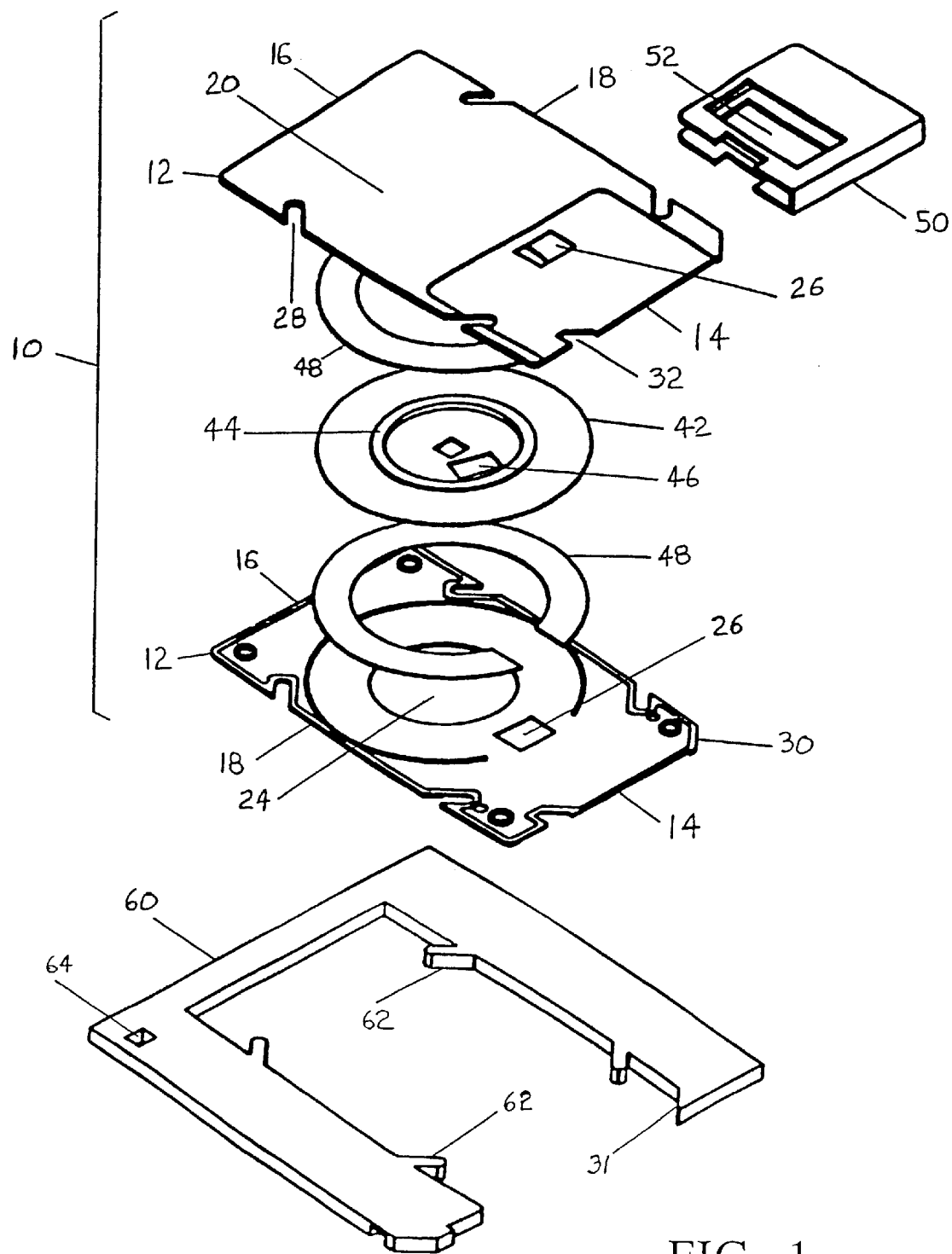
FIG. 1 is an exploded isometric view of a first embodiment of the data storage cartridge and adapter according to the present invention.

Referring now to the attached drawing Figures, wherein identical reference numerals are used throughout to designate the same or similar elements, FIG. 1 depicts a first embodiment of the invention. Shown in FIG. 1 is a data storage cartridge 10 which includes a housing 12 having a front edge 14, a rear edge 16, and two side edges 18. Depending top face 20 and bottom face 22 (not visible in FIG. 1, see FIG. 5) complete the housing 12. The housing defines an interior volume which is dimensioned and configured to accommodate a disk medium 40 (see FIG. 7) rotatably within the interior volume.

As shown in FIG. 1, the disk medium includes a disk-shaped data storage and retrieval material 42 surrounding and fixed to a central hub 44. Within the housing 12 may also be placed friction-reducing gaskets 48 adjacent to the top and bottom faces of the data storage and retrieval material 42. The gaskets function to reduce frictional wear on the data storage and retrieval material.

Figure 5:
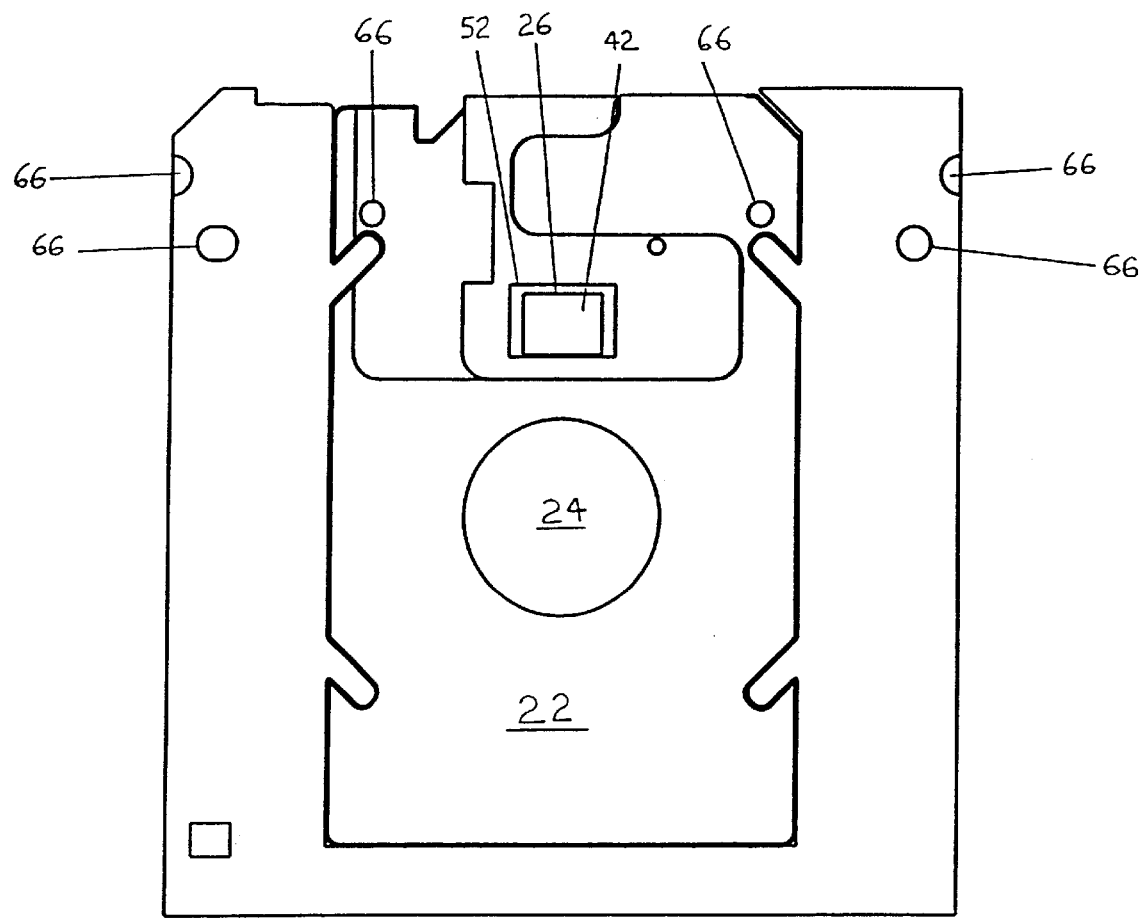
FIG. 5 is a bottom plan view of the data storage cartridge and adapter combination shown in FIG. 4.

The bottom face 22 of the housing further includes an aperture 24 which is complimentary to the dimensions of the hub 44 (see also FIG. 5). The aperture 24 is dimensioned so as to allow operational access to the hub by a spindle of a disk drive device designed for a second cartridge which is generally larger in size than the data storage cartridge 10.

The housing 12 of the data storage cartridge 10 further includes at least a second aperture 26 which is disposed, dimensioned, and configured such that the data storage and retrieval material 42 is operationally accessible to the read/write heads in the chosen disk drive device designed for the second cartridge. As shown in FIG. 1, the second aperture 26 passes through both the top face 20 and bottom face 22 of the housing 12 in the same fashion as a 3.5-inch format floppy disk. As described more fully below and depicted in FIG. 8, the aperture 26 may also pass through the front edge 14 of the housing in the same fashion as a "ZIP"-brand floppy disk cartridge.

The data storage cartridge 10 further includes a shutter 50 having an aperture 52 passing therethrough for shielding access to the data storage and retrieval material 42 via the aperture 26.

Figure 2:
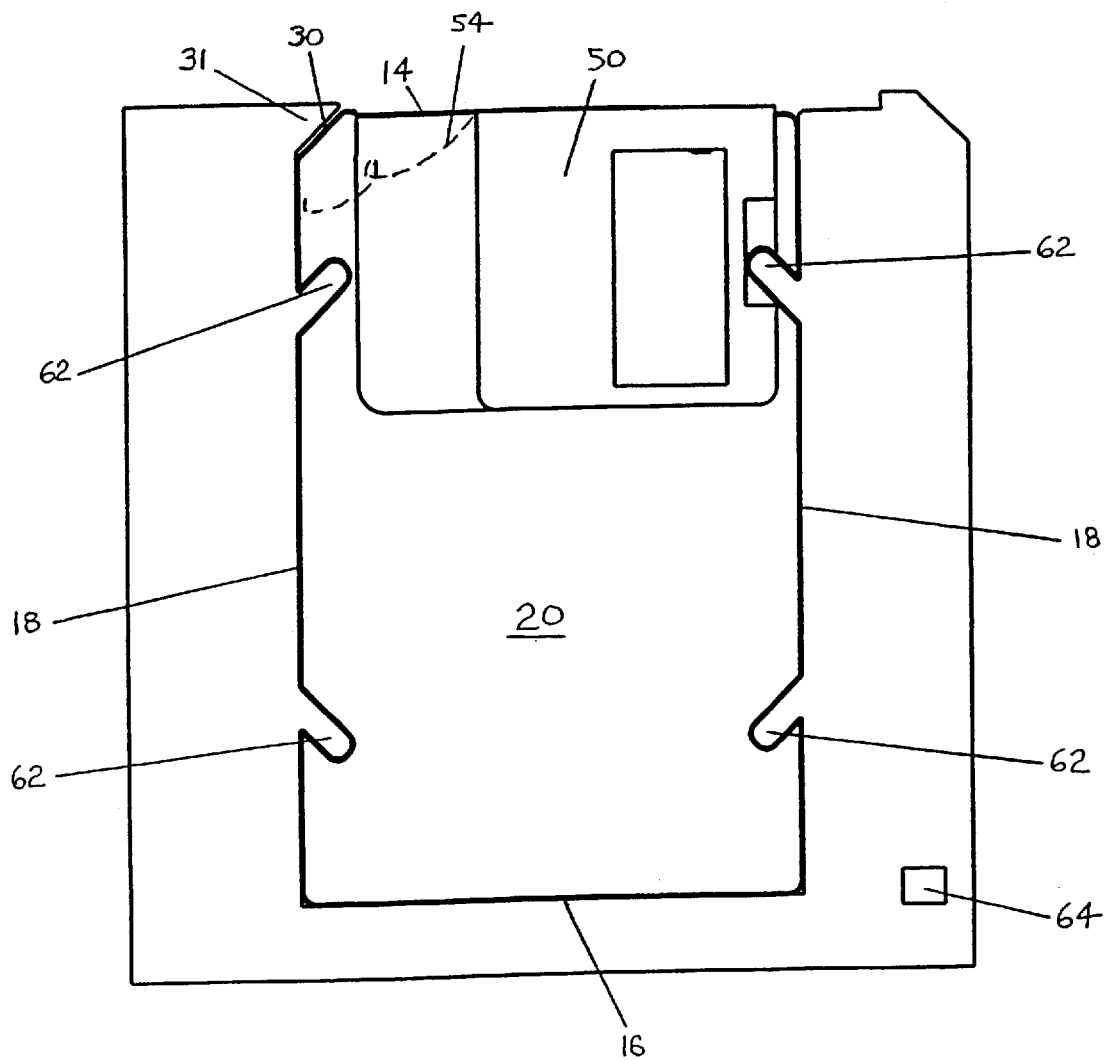
FIG. 2 is a top plan view of the data storage cartridge and adapter combination shown in FIG. 1 with the shutter 50 in the closed position.
Figure 3:
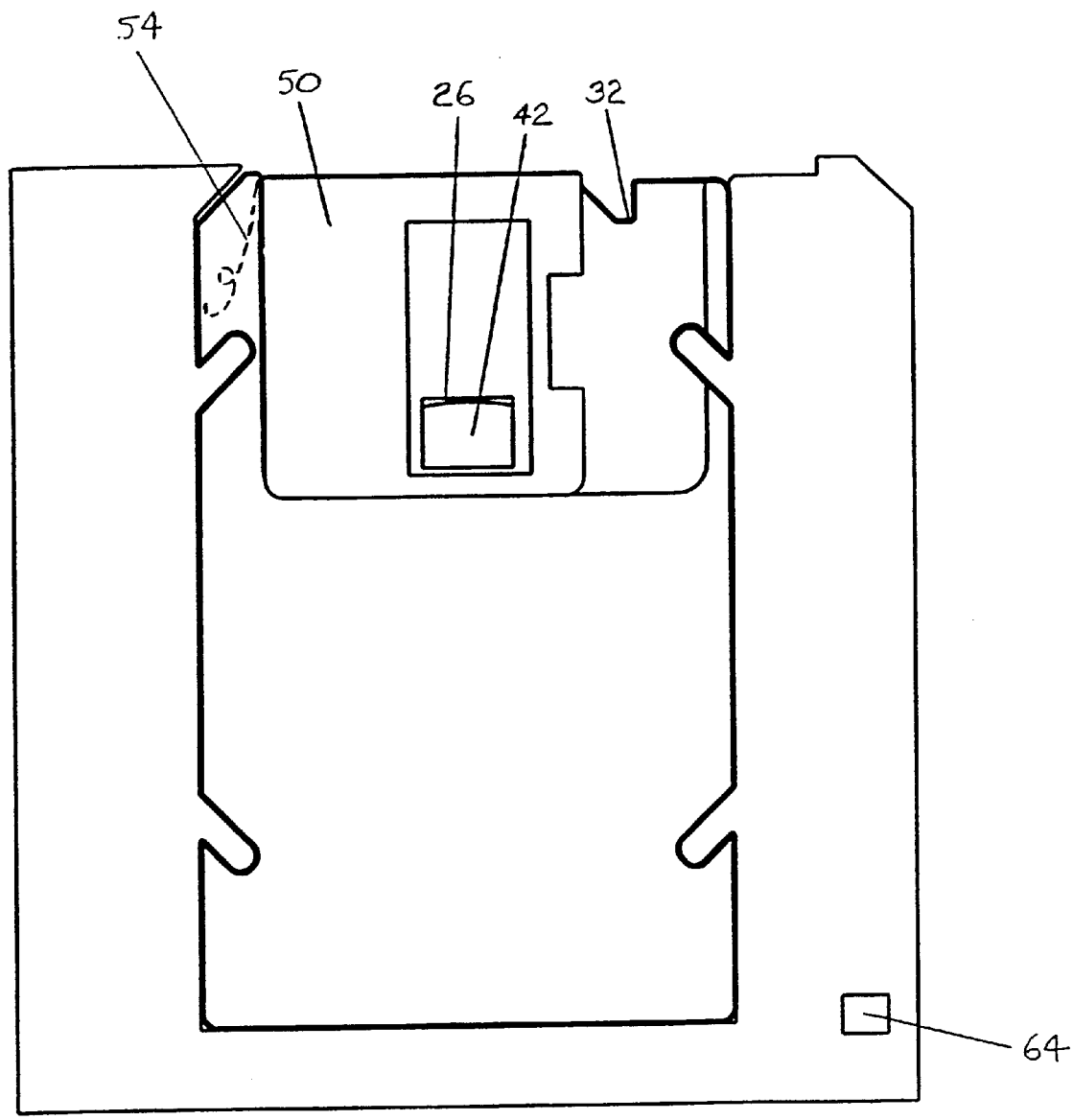
FIG. 3 is a top plan view of the data storage cartridge and adapter combination shown in FIG. 1 with the shutter 50 in the open position.

Referring now to FIGS. 2 and 3, which both are top plan views of the embodiment depicted in FIG. 1, the shutter 50 slidingly engages the housing 12 about its top face 20, front edge 14, and bottom face 22. FIG. 2 depicts the shutter 50 in the closed position. Here, access to the data storage and retrieval material 42 via the aperture 26 is prevented. This minimizes damage to the data and storage retrieval material from physical contact, moisture, light, etc.

FIG. 3 depicts the shutter 50 in the open position. Here, aperture 26 and storage and retrieval material 42 are clearly visible through the shutter aperture 52 (see FIG. 1).

The data storage cartridge 10 has external dimensions (i.e., length, width, and height) which allow it to form a releasible friction engagement with an adapter 60. The adapter is a planar, substantially U-shaped body. The internal dimensions of the U-shaped body are complementary to the dimensions of the side edges 18 and rear edge 16 of the housing 12 of the data storage cartridge 10. This allows the data storage cartridge to be frictionally and releasibly engaged within the cavity defined by the U-shaped body of the adapter 60 about the cartridge's rear and side edges.

The frictional engagement of the data storage cartridge within the adapter is aided by retaining tabs 62 in the adapter and complimentary retaining notches 28 in the data storage cartridge. Orienting tab 31 in the adapter may be provided along with complementary orienting notch 30 in the data storage cartridge to ensure that the data storage cartridge can only be frictionally engaged within the adapter in a single, proper orientation.

The retaining notches 28 in the data storage cartridge may also be disposed in such a fashion as to serve as motion-limiting stops to limit the motion of the disk-shaped data storage and retrieval material 42 and its associated hub 44. In this configuration, the retaining notches 28 maintain the hub 44 in registration with the aperture 24.

As shown in the Figures, the adapter 60 is configured so as to allow access to the front edge 14 of the data storage cartridge. This enables the shutter 50 to be opened by a disk drive device and the data storage and retrieval material to be accessed.

As shown in FIG. 5, which is a bottom plan view of the data storage cartridge and adapter combination, the adapter 60 may also include locating datums 66 for properly orienting the data storage cartridge and adapter within a disk drive device.

Of critical importance in the present invention is that the data storage cartridge and adapter combination must have combined external dimensions (when the data storage cartridge is frictionally engaged within the adapter) which duplicate the dimensions of a second, larger cartridge such that the data storage cartridge 10 of the present invention can be utilized within a disk drive device designed for the second cartridge which is larger in size. Consequently, the length, width, height, and configuration of the data storage cartridge/adapter combination must be substantially identical to those of the second cartridge so that the data storage cartridge/adapter combination can be inserted into and function with the disk drive device designed for the second cartridge.

Likewise, the data storage and retrieval material 42 and hub 44 must be disposed within the data storage cartridge 10 such that the material can be operationally accessed by the read/write heads of the disk drive apparatus and the hub can be operationally accessed, chucked to, and rotated by the spindle of the disk drive apparatus.

As shown in FIGS. 1–6, the data storage cartridge/adapter combination has external dimensions which are substantially identical to that of a conventional 3.5-inch format floppy disk cartridge. As noted above, this floppy disk format is widely used and extremely well known. By duplicating its dimensions, the combined data storage cartridge 10 and adapter 60 allows the much smaller data storage cartridge (smaller than a 3.5-inch floppy disk) to be utilized within a disk drive device specifically designed for the 3.5-inch format floppy disks.

In the preferred embodiment, the length and width of the data storage cartridge duplicate the length and width of a standard credit card; i.e., about 3.375 inch in length by 2.125 inch in width, thereby yielding an aspect ratio of about 1.6. These dimensions are preferred because it allows the data storage cartridge 10 to be conveniently carried in a wallet or purse separate from the adapter 60.

Also preferred is the embodiment shown in FIGS. 1–6, wherein the data storage cartridge/adapter combination has all of the physical attributes of a standard 3.5-inch format floppy disk. For instance, the data storage cartridge 10 is provided with a shutter notch 32 which allows the shutter 50 to be accurately opened to allow access to the data storage and retrieval material 42. This is performed by the disk drive device via means for sliding the shutter which are provided within the disk drive device. As in conventional 3.5-inch floppy disks, it is preferred that the shutter 50 be biased toward the closed position to limit access to the data storage and retrieval material when the data storage cartridge is not in use. Generally this is accomplished by any suitable means for biasing such as the biasing spring 54 shown in FIGS. 2 and 3. As shown in FIG. 2, the spring 54 is in an extended position, forcing the shutter closed. The shutter 50 can be motioned to the left, as shown in FIG. 3, to gain access to the data storage and retrieval material, thereby compressing the spring 54. In order to maintain the shutter 50 in the open position, it must be forced against the spring 54 with a force which is opposite in direction to the spring and sufficient to overcome the resistance provided by the spring. In the absence of any counterprevailing force, the spring 54 forces the shutter 50 into the closed position as shown in FIG. 2.

Figure 4:
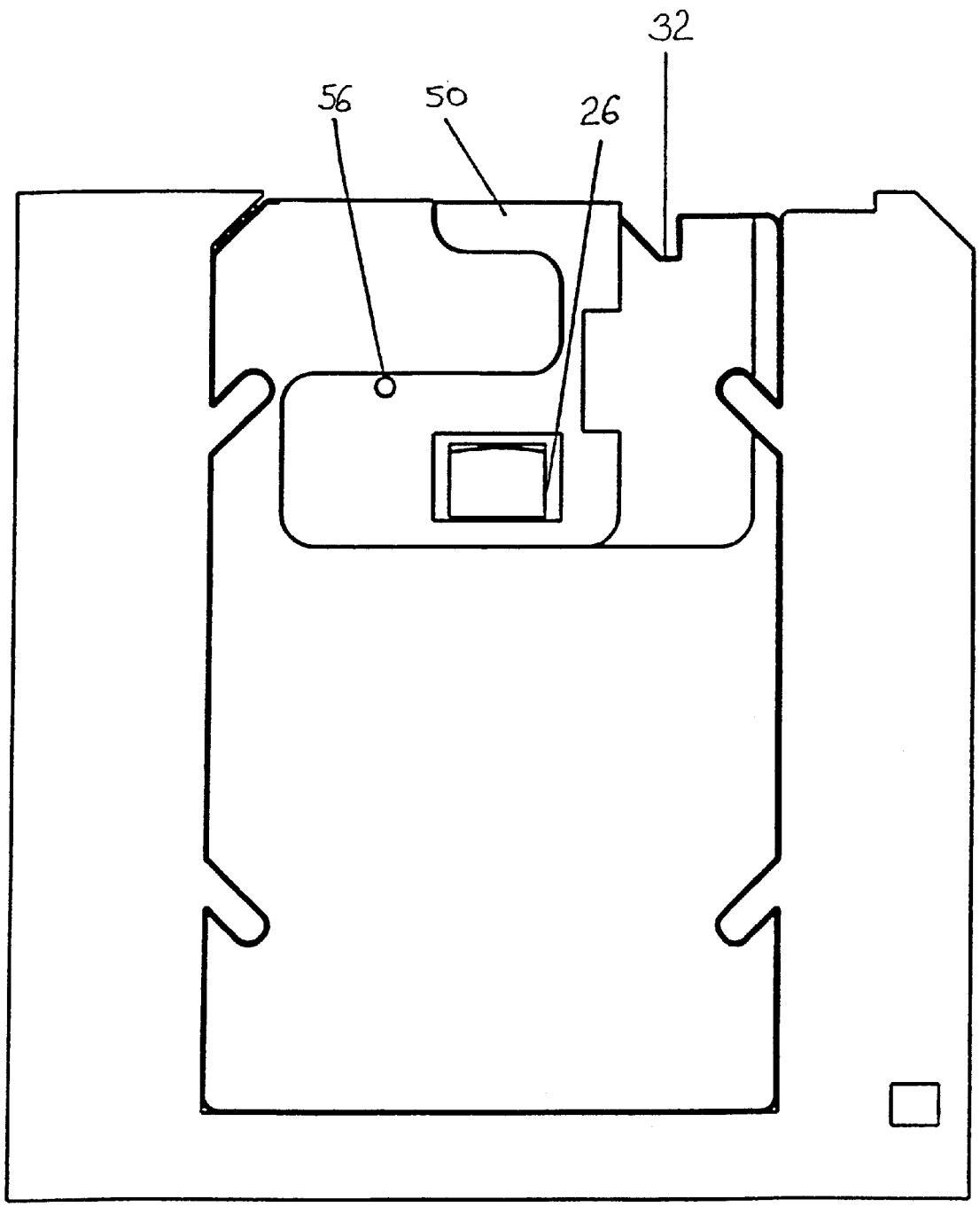
FIG. 4 is a top plan view of a second embodiment of the data storage cartridge and adapter combination, this embodiment having a roughly L-shaped shutter. The shutter is shown in the open position.
Figure 6:
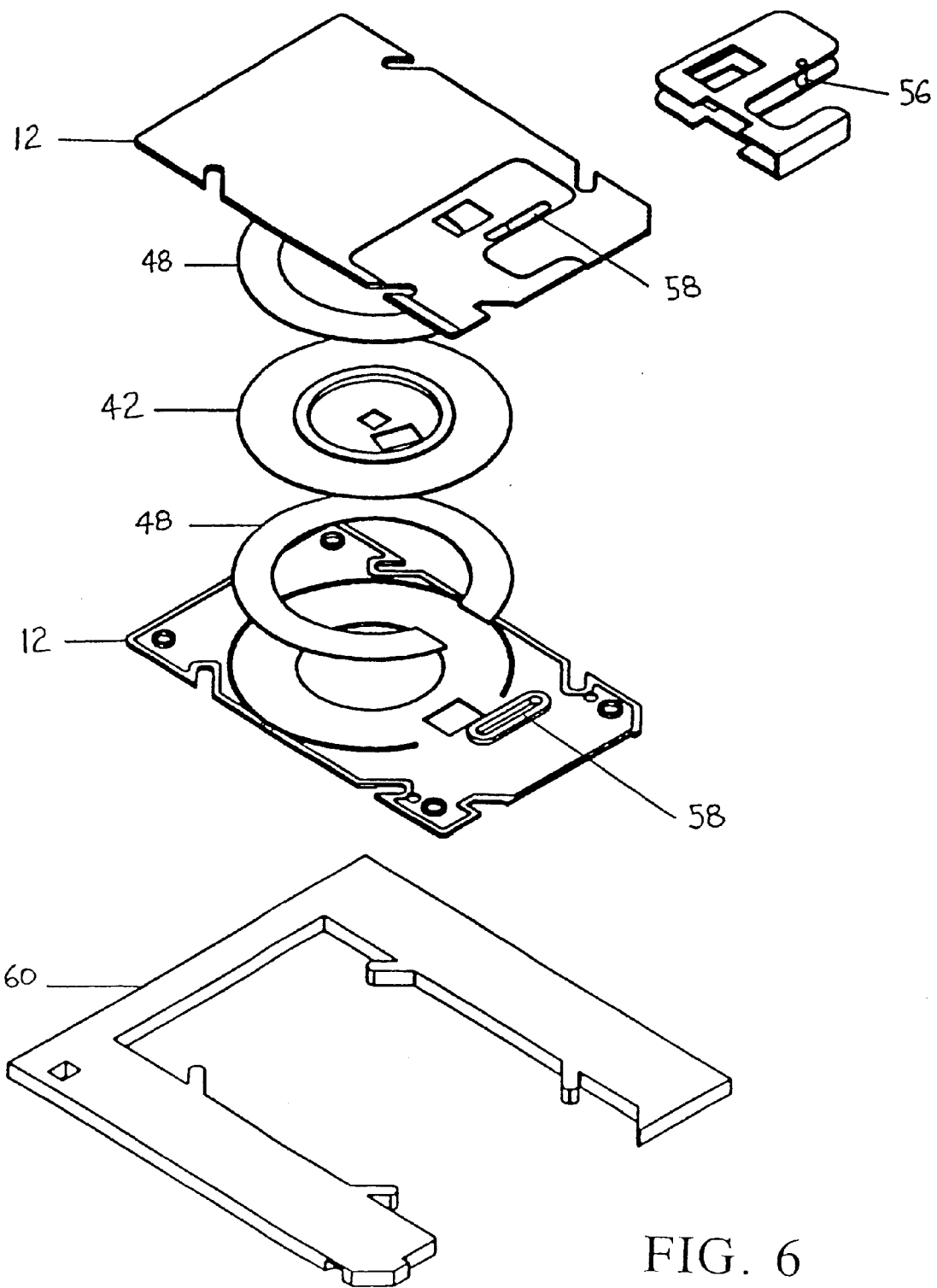
FIG. 6 is an exploded isometric view of the second embodiment of the invention as shown in FIGS. 4 and 5.

A second embodiment of the shutter 50 is shown in FIGS. 4–6. When configured with the preferred aspect ratio of about 1.6, the data storage cartridge 10 can only rotatably accommodate a disk medium whose diameter is slightly smaller than the width of the data storage cartridge. Consequently, a certain amount of non-occupied space is provided near the front edge 14 of the housing 12. As best shown in FIG. 6, this allows a groove 58 to be disposed within the housing 12 outside the diameter of the data storage and retrieval material. A complementary guide 56 is provided in shutter 50 such that when the shutter is affixed to the housing 12, the guide 56 passes through the groove 58 and is retained therein. This allows the shutter 50 to be very securely bound to the housing of the data storage cartridge 10, while still allowing the shutter to slide back and forth between an open and a closed position. As shown in FIG. 6, the guide 56 slidingly engages the groove 58 to accomplish the intended sliding motion of the shutter 50. It is preferred that the guide is permanently fixed to both the portion of the shutter which rests on the top face of the housing and the portion of the shutter which rests on the bottom face of the housing. This feature of the shutter allows the data storage cartridge to be handled roughly without fear of accidentally damaging the shutter or physically separating the shutter from the housing.

The empty space in the front portion of the housing also provides a cavity into which can be placed a "smart-card" chip. This allows the data storage cartridge to be used as a "smart-card" in addition to a floppy disk storage cartridge. By the term "smart card" is meant a portable card containing a microprocessor chip which can store, retrieve, and process information for or about the holder of the card.

As best shown in FIGS. 4 and 5, the shutter is roughly L-shaped and includes an aperture 52 passing therethrough. Both FIG. 4 (a top plan view) and FIG. 5 (a bottom plan view) show the shutter 50 in the open position. The housing aperture 26 and data storage and retrieval material 42 are visible in both Figures. FIG. 5 also clearly depicts the first aperture in the bottom face 24 of the housing 12. As shown in FIG. 5, the hub 44 has been omitted for purpose of clarity.

Figure 7:
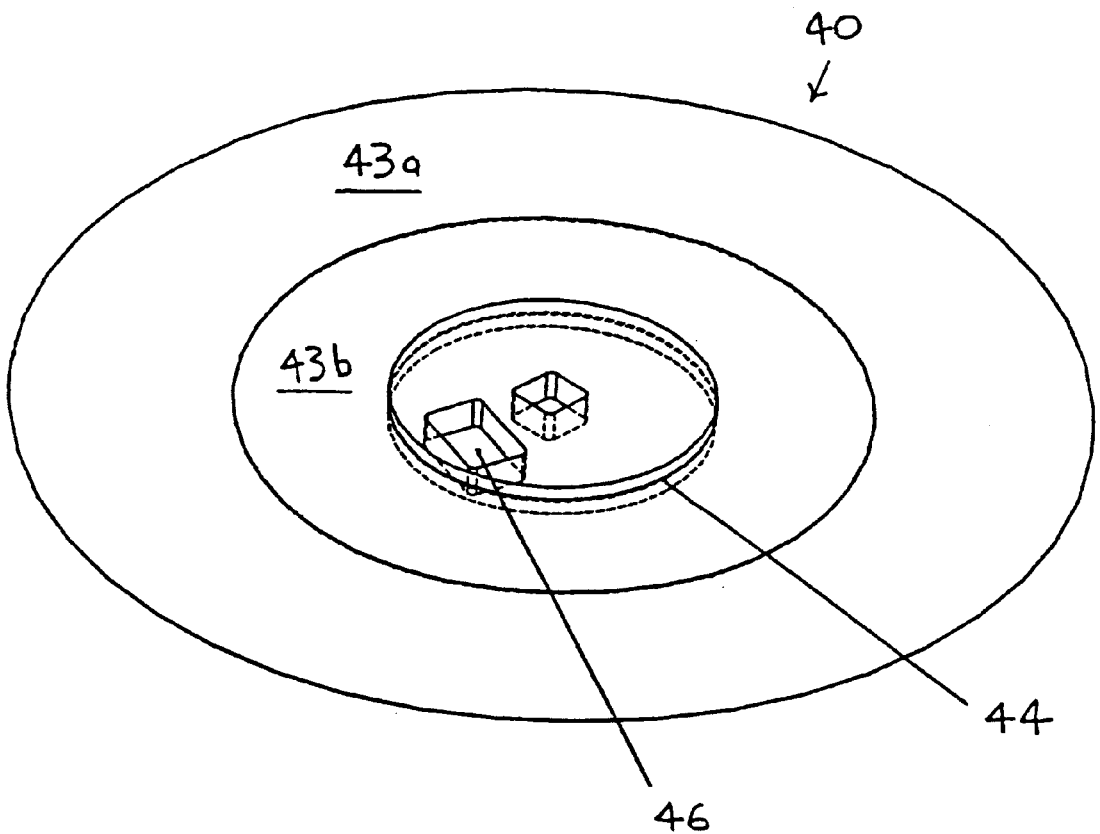
FIG. 7 is an isometric view of a disk medium having a dual-density, disk-shaped data storage and retrieval material surrounding a central hub.

FIG. 7 depicts a disk medium 40 for incorporation within the data storage cartridge 10. As shown in FIG. 7, the disk medium 40 includes a dual-density, diskshaped data storage and retrieval material comprising a first data storage and retrieval material 43a having a first data storage density and a second data storage and retrieval material 43b having a second data storage density either greater than or lesser than the data storage density of 43a. The first and second data storage and retrieval materials are disposed concentrically about each other and the hub 44. The data storage and retrieval material may also be a unitary material having a constant data storage density throughout.

Also shown in FIG. 7 are conventional means for chucking 46. Here, the means are shown as an off-center aperture which is conventional to the 3.5-inch format. The aperture 46 engages with a complementary prong on the spindle of a 3.5-inch format disk drive device to provide accurate and step-wise rotation of the data storage and retrieval medium.

With respect to the dual-density data storage and retrieval material itself, it is noted that conventional high-density, double-sided 3.5-inch format floppy disks have a data capacity of approximately 1.44 megabytes. However, there have recently been introduced into the marketplace floppy disk which share the 3.5 inch dimensions, but into which is placed a data storage and retrieval material which provides a much increased capacity of greater than 100 megabytes. As noted above, the Imation Enterprises Corporation markets the "SUPERDISK"-brand floppy disk which has dimensions which are identical to the conventional 3.5-inch format floppy disk. The "SUPERDISK"-brand floppy disks can be inserted into a standard 3.5-inch disk drive apparatus. It must be noted, however, that Imation markets a proprietary disk drive device which operates with both the 120 megabyte "SUPERDISK"-brand floppy disks as well as the conventional 1.44 megabyte-capacity 3.5-inch disks. Therefore, by using a dual-density data storage and retrieval material as shown in FIG. 7, a single data storage cartridge 10 can be utilized alternatively in either a standard 3.5-inch format disk drive device or a "SUPERDISK"-brand disk drive device.

With the dual-density data storage and retrieval material in place, the data storage cartridge of the present invention provides true "two-way" compatibility: the data storage cartridge can be used in both conventional 3.5-inch format disk drive or in the newer "SUPERDISK"-brand disk drive device (which utilize the same 3.5-inch format dimensions and configuration, but has a much larger data storage capacity).

For purposes of the present invention, the nature and data storage capacity of the data storage and retrieval material is not critical so long as the material functions in the disk drive device chosen by the user. Consequently, the data storage and retrieval material can be any magnetic, magneto-optical, or optical material now known or developed in the future for the storage of data for access and retrieval by a disk drive device.

FIGS. 8–11 depict a third embodiment of the invention in which the external dimensions of the data storage cartridge/adapter combination are substantially identical to that of a "ZIP"-brand data storage cartridge. As noted above, "ZIP" is a trademark of Iomega Corporation, which markets complementary data storage cartridges and disk drive devices under the "ZIP" trademark. Since their introduction to the market in 1995, "ZIP"-brand format drives and cartridges have become very popular with computer users.

Figure 8:
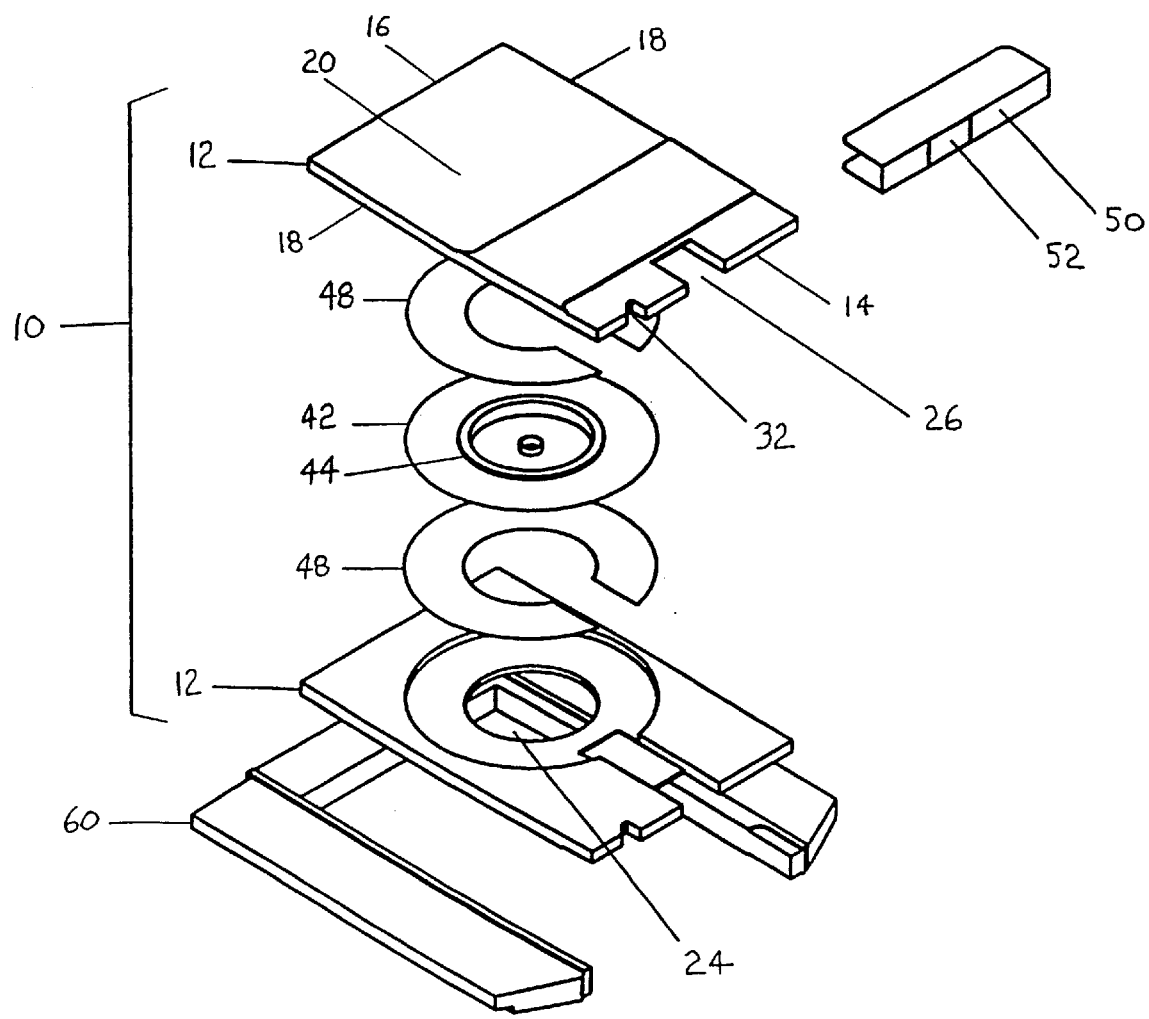
FIG. 8 is an exploded isometric view of a third embodiment of the data storage cartridge and adapter combination. As shown here, the combination has the external dimensions of a "ZIP"-brand cartridge.

As shown in FIG. 8, which is an exploded isometric view of the third embodiment of the invention, the data storage cartridge 10 includes a housing 12 having a front edge 14, a rear edge 16, and side edges 18. As in the first embodiment, the housing includes a top face 20 and a bottom face 22 (see FIG. 10). The housing defines an interior volume which is dimensioned and configured to rotatably house a disk-shaped data storage and retrieval material 42 surrounding a hub 44. Anti-friction gaskets 48 may be provided to protect the data storage and retrieval material. The data storage and retrieval material and its accompanying hub are disposed within the interior volume of the housing such that the hub is in registration with and accessible through aperture 24.

Departing from the embodiments shown in FIG. 1, the third embodiment shown in FIG. 8 includes at least a second aperture 26 which is disposed about the front edge 14 of the housing 12. A shutter 50 having an aperture 52 passing therethrough is slidingly engaged about the top face 20, front edge 14, and bottom face 22 of the housing 12 such that aperture 52 of the shutter can be slidingly placed into registration with aperture 26.

Figure 9:
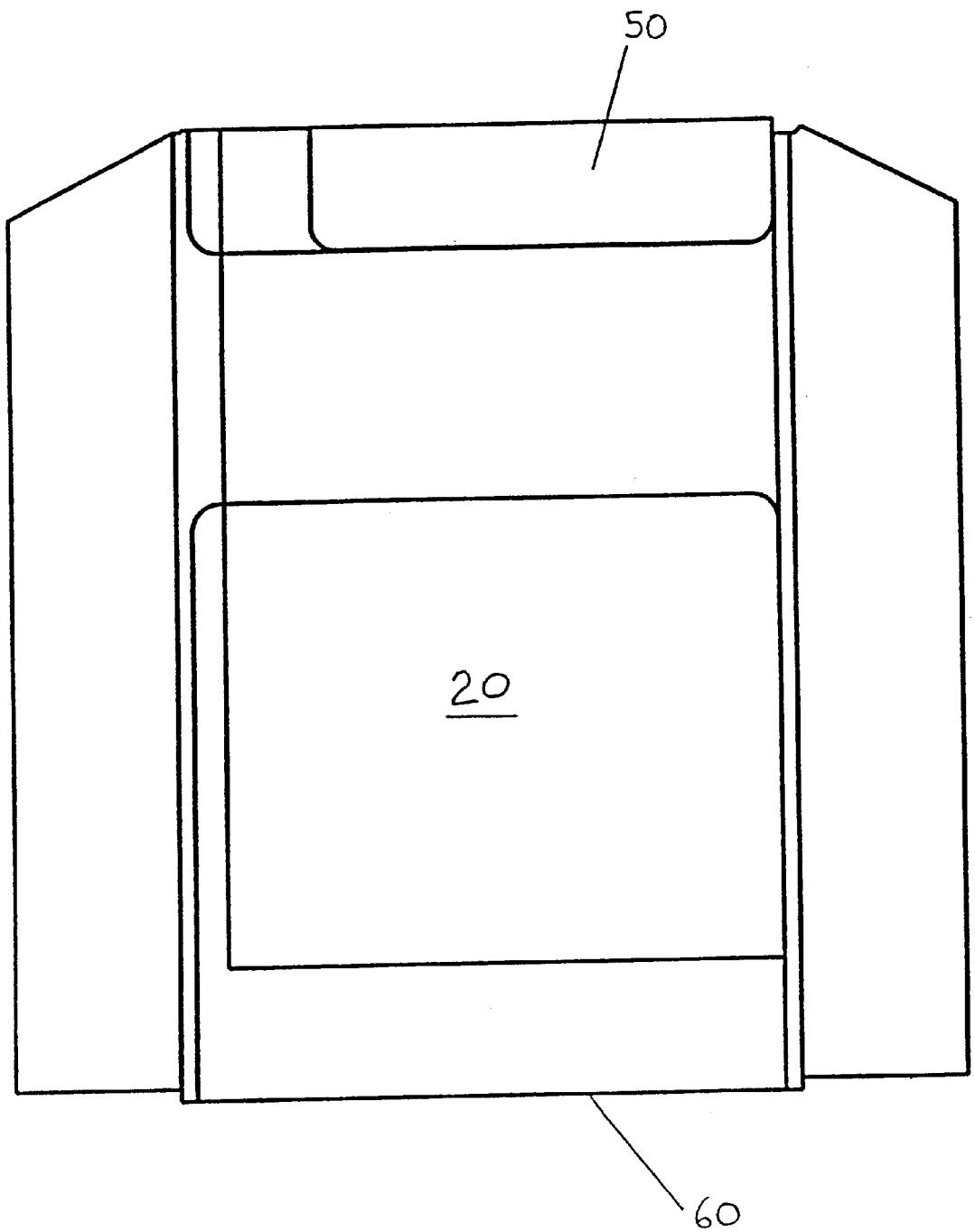
FIG. 9 is a top plan view of the third embodiment of the invention as shown in FIG. 8.
Figure 10:
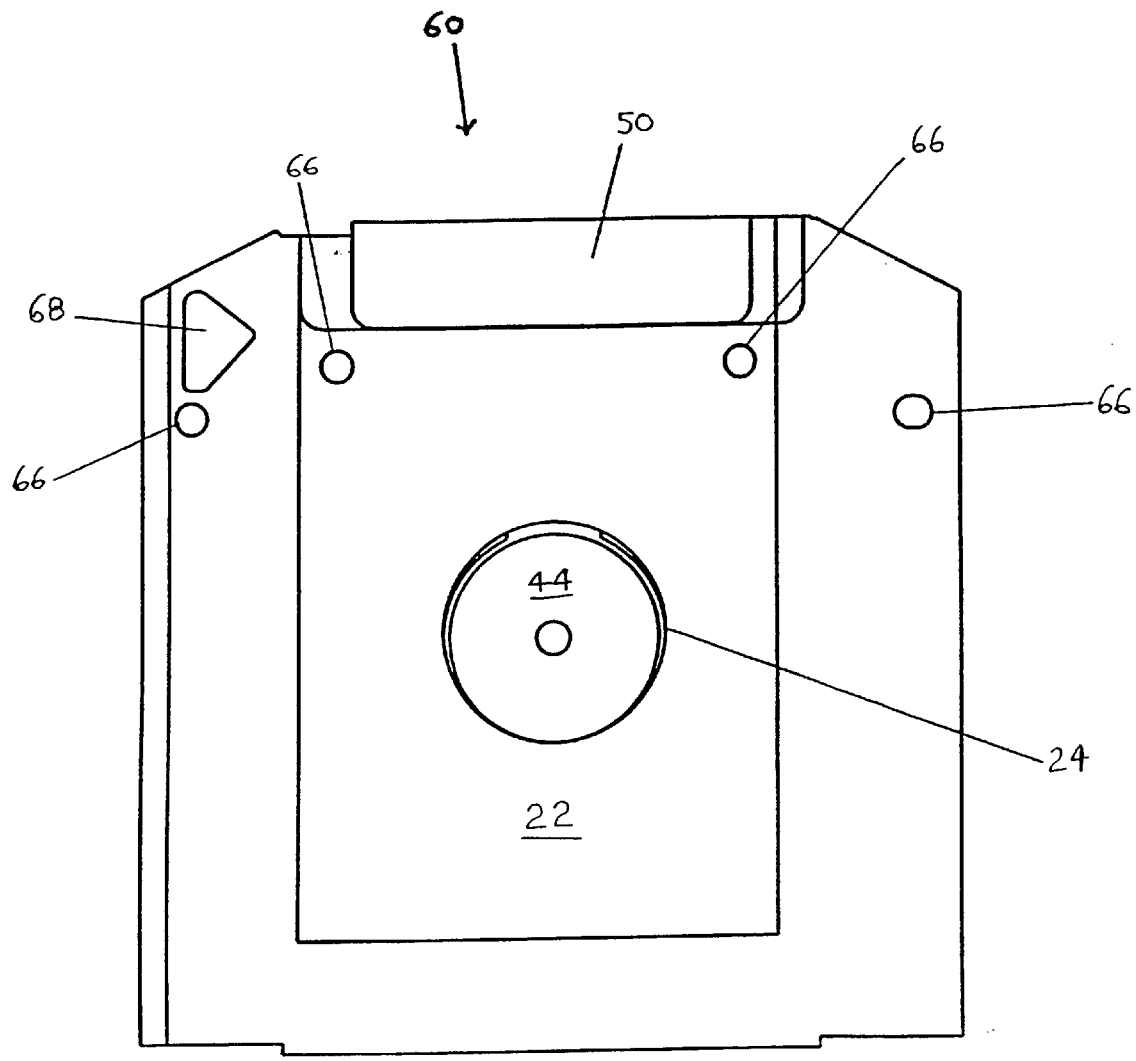
FIG. 10 is a bottom plan view of the third embodiment of the invention as shown in FIG. 8.

The shutter 50 functions in exactly the same fashion as described above. As shown in FIG. 9, which is a top plan view, and FIG. 10, which is a bottom view plan, the shutter 50 is in the closed position. The adapter 60 is substantially identical to the description given above with the exception that the external dimensions of the data storage cartridge/adapter combination are substantially identical to those of a "ZIP"-brand data storage cartridge. As shown in FIG. 10, the adapter 60 includes features of a "ZIP"-brand drive such as reflector 68 and locating datums 66. The data storage cartridge 10 may also include locating datums 66. Additionally, FIG. 10 depicts the placement of the hub 44 in registration with aperture 24.

Figure 11:
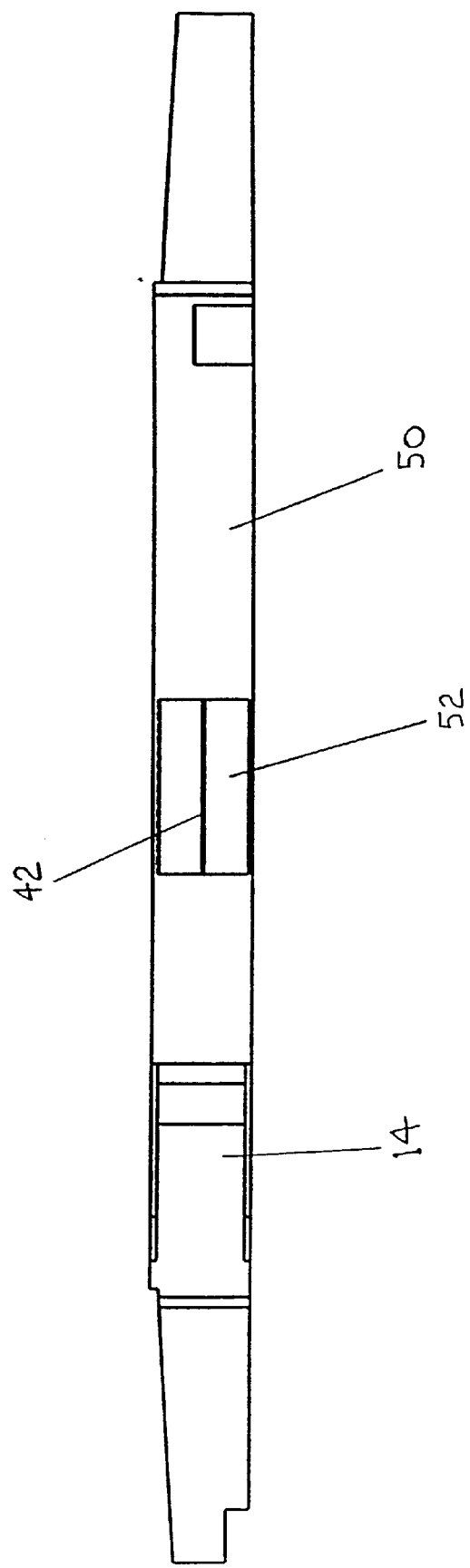
FIG. 11 is a front elevational view of the data storage cartridge and adapter combination as shown in FIG. 9.

FIG. 11 shows a front elevational view of the data storage cartridge/adapter combination shown in FIG. 9. Here, the shutter 50 is shown in the open position. In this position, the apertures 52 and 26 (unmarked) are in registration, thereby exposing the data storage and retrieval medium 42. This allows a "ZIP"-brand disk drive to access the data storage retrieval medium 42.

It is understood that the invention is not confined to the particular construction and arrangement of parts herein illustrated and described, but embraces all such modified forms thereof as come within the scope of the following claims.

What is claimed is:

1. A data storage cartridge in combination with an adapter, the adapter dimensioned and configured to orient the data storage cartridge so that it operates in a disk drive device designed for a second cartridge which is larger in size than the data storage cartridge, comprising:

a data storage cartridge comprising:

a planar housing having opposing front and rear edges and two opposing side edges, the edges connected by depending top and bottom faces, thereby defining an external length, width and height and an interior volume, the interior volume dimensioned and configured for rotatably accommodating a disk medium therein, the housing further having a first aperture in the bottom face thereof and at least a second aperture therein; and a disk medium comprising a disk-shaped data storage and retrieval material and a hub disposed at the center thereof, the disk medium rotatably disposed within the interior volume of the data storage cartridge such that the hub is operationally accessible to a spindle in the disk drive device for the second cartridge via the first aperture and the data storage and retrieval material is operationally accessible to a read/write head in the disk drive device for the second cartridge via the second aperture;

in combination with:

an adapter comprising a planar, substantially U-shaped body dimensioned and configured to form a friction fit against the rear and side edges of the data storage cartridge;

and wherein when the data storage cartridge is disposed within the adapter to yield a cartridge-adapter combination, the combination has external dimensions which are substantially identical to the external dimensions of the second cartridge.

2. The combination of claim 1, wherein when the data storage cartridge is disposed within the adapter, the external dimensions of the combination duplicate the dimensions of a 3.5-inch-format floppy disk.

3. The combination of claim 1, wherein when the data storage cartridge is disposed within the adapter, the external dimensions of the combination duplicate the dimensions of a "ZIP"-brand-format data storage cartridge.

4. The combination of claim 1, wherein the housing of the data storage cartridge includes a plurality of retaining notches in the side edges thereof and the adapter includes a corresponding plurality of complementary, interengaging retaining tabs, the retaining notches disposed in the housing so as to maintain the hub of the disk medium in registration with the first aperture.

5. The combination of claim 1, wherein the housing of the data storage cartridge has a length of about 3.375 inches (8.573 cm) and a width of about 2.125 inches (5.398 cm).

6. The combination of claim 1, wherein the disk-shaped data storage and retrieval material is comprised of a first data storage and retrieval material having a first data storage density and a second data storage and retrieval material having a second data storage density either greater than or lesser than the data storage density of the first data storage and retrieval material, the second data storage and retrieval material disposed concentrically about the first.

7. A data storage cartridge in combination with an adapter, the adapter dimensioned and configured to orient the data storage cartridge so that it operates in a 3.5-inch-format disk drive device comprising:

a data storage cartridge comprising:

a planar housing having opposing front and rear edges and two opposing side edges, the edges connected by depending top and bottom faces, thereby defining an external length, width and height and an interior volume, the interior volume dimensioned and configured for rotatably accommodating a disk medium therein, the housing further having a first aperture in the bottom face thereof, a second aperture in the bottom face thereof, and a third aperture in the top face thereof, the third aperture in registration with the second;

a disk medium comprising a disk-shaped data storage and retrieval material and a hub disposed at the center thereof, the disk medium rotatably disposed within the interior volume of the data storage cartridge such that the hub is operationally accessible to a spindle of a 3.5-inch-format disk drive device via the first aperture and the data storage and retrieval material is operationally accessible to a read/write head in the 3.5-inch-format disk drive device via the second and third apertures; and an L-shaped shutter disposed about the top face, front edge, and bottom face of the housing and slidingly fixed thereto, the shutter movable between a first closed position blocking the second and third apertures and a second open position allowing access to the second and third apertures;

in combination with:

an adapter comprising a planar, substantially U-shaped body dimensioned and configured to form a friction fit against the rear and side edges of the data storage cartridge;

and wherein when the data storage cartridge is disposed within the adapter to yield a cartridge-adapter combination, the combination has external dimensions which are substantially identical to a 3.5-inch-format floppy disk cartridge.

8. The combination according to claim 7, wherein the housing further includes a groove passing entirely therethrough, the groove disposed parallel to the front edge of the housing, and the L-shaped shutter further includes a complementary guide disposed in the groove, the guide permanently fixed to the shutter at a first point where the shutter contacts the top face of the housing and at a second point where the shutter contacts the bottom face of the housing, whereby the shutter is slidingly fixed to the housing.

9. The combination of claim 7, wherein the housing of the data storage cartridge includes a plurality of retaining notches in the side edges thereof and the adapter includes a corresponding plurality of complementary, interengaging retaining tabs, the retaining notches disposed in the housing so as to maintain the hub of the disk medium in registration with the first aperture.

10. The combination of claim 7, wherein the housing of the data storage cartridge has a length of about 3.375 inches (8.573 cm) and a width of about 2.125 inches (5.398 cm).

11. The combination of claim 7, wherein the disk-shaped data storage and retrieval material is comprised of a first data storage and retrieval material having a first data storage density and a second data storage and retrieval material having a second data storage density either greater than or lesser than the data storage density of the first data storage and retrieval material, the second data storage and retrieval material disposed concentrically about the first.

12. A data storage cartridge in combination with an adapter, the adapter dimensioned and configured to orient the data storage cartridge so that it operates in a "ZIP"-brand-format disk drive device comprising:

a data storage cartridge comprising:

a planar housing having opposing front and rear edges and two opposing side edges, the edges connected by depending top and bottom faces, thereby defining an external length, width and height and an interior volume, the interior volume dimensioned and configured for rotatably accommodating a disk medium therein, the housing further having a first aperture in the bottom face thereof and a second aperture in the front edge thereof;

a disk medium comprising a disk-shaped data storage and retrieval material and a hub disposed at the center thereof, the disk medium rotatably disposed within the interior volume of the data storage cartridge such that the hub is operationally accessible to a spindle in a "ZIP"-brand-format disk drive device via the first aperture and the data storage and retrieval material is operationally accessible to a read/write head of the "ZIP"-brand-format disk drive device via the second aperture; and a shutter disposed about the top face, front edge, and bottom face of the housing and slidingly fixed thereto, the shutter movable between a first closed position blocking the second aperture and a second open position allowing access to the second aperture;

in combination with:

an adapter comprising a planar, substantially U-shaped body dimensioned and configured to form a friction fit against the rear and side edges of the data storage cartridge;

and wherein when the data storage cartridge is disposed within the adapter to yield a cartridge-adapter combination, the combination has external dimensions which are substantially identical to a "ZIP"-brand-format floppy disk.

13. The combination of claim 12, wherein the housing of the data storage cartridge includes a plurality of retaining notches in the side edges thereof and the adapter includes a corresponding plurality of complementary, interengaging retaining tabs, the retaining notches disposed in the housing so as to maintain the hub of the disk medium in registration with the first aperture.

14. The combination of claim 12, wherein the housing of the data storage cartridge has a length of about 3.375 inches (8.573 cm) and a width of about 2.125 inches (5.398 cm).

15. The combination of claim 12, wherein the disk-shaped data storage and retrieval material is comprised of a first data storage and retrieval material having a first data storage density and a second data storage and retrieval material having a second data storage density either greater than or lesser than the data storage density of the first data storage and retrieval material, the second data storage and retrieval material disposed concentrically about the first.

* * * * *